United States Patent
Francois (10) Patent No.: US 10,208,548 B2
(45) Date of Patent: Feb. 19, 2019

(54) METHOD FOR DETECTING GAIN OR LOSS OF DRILLING FLUID IN A DRILLING INSTALLATION ASSOCIATED CALCULATION SYSTEM AND ASSOCIATED DRILLING INSTALLATION

(71) Applicant: Geoservices Equipements, Roissy en France (FR)

(72) Inventor: Matthias Francois, Roissy en France (FR)

(73) Assignee: GEOSERVICES EQUIPMENTS, Roissy en France (FR)

( * ) Notice: Subject to any disclaimer, the term of this patent is extended or adjusted under 35 U.S.C. 154(b) by 102 days.

(21) Appl. No.: 15/375,660

(22) Filed: Dec. 12, 2016

(65) Prior Publication Data
US 2017/0175467 A1 Jun. 22, 2017

(30) Foreign Application Priority Data
Dec. 17, 2015 (EP) ..................................... 15290320

(51) Int. Cl.
*E21B 21/01* (2006.01)
*E21B 21/08* (2006.01)
(Continued)

(52) U.S. Cl.
CPC .............. *E21B 21/08* (2013.01); *E21B 21/01* (2013.01); *E21B 21/10* (2013.01); *E21B 47/08* (2013.01);
(Continued)

(58) Field of Classification Search
CPC . E21B 21/08; E21B 21/01; G01F 9/00; G01F 23/0076; G08B 21/182
See application file for complete search history.

(56) References Cited

U.S. PATENT DOCUMENTS 3,638,485 A 2/1972 Knauth
3,726,136 A 4/1973 McKean et al.
(Continued)

FOREIGN PATENT DOCUMENTS

WO 2010043951 A2 4/2010

OTHER PUBLICATIONS

Blay et al. "A New Generation of Well Surveillance for Early Detection of Gains and Losses When Drilling Very High Profile Ultradeepwater Wells, Improving Safety, and Optimizing Operating Procedures"—SPE 158374, SPETT 2012 Energy Conference & Exhibition—(10 pages).
(Continued)

*Primary Examiner* — D. Andrews
*Assistant Examiner* — Yanick A Akaragwe (57) ABSTRACT

The present disclosure concerns a method for detecting gain or loss of drilling fluid in a drilling installation, said drilling installation comprising a drilling pipe, drilling fluid pits and a hydraulic connection between the pits and the drilling pipe. Said method comprises:
providing (116, 118), during a first period, a set of measurement values ($va_{i,m}$; $vc_{j,m}$) representative of a volume of drilling fluid in each of the pits belonging to a predetermined group (112, 113); then
based on volume measurement values, identifying (148) volume variations occurring during the first period for the pits of the predetermined group, each volume variation of a pit being associated with a volume variation period;
calculating (162), for each measuring time ($t_m$), a corrected cumulated volume of drilling fluid ($V'_m$) for the pits of the predetermined group, based on the identified volume variation occurring in at least a sub-group (113) of the predetermined group, and
(Continued)

estimating (163) a first value ($A_m$) for a gain or loss of drilling fluid at a measuring time ($t_m$) by comparing the corrected cumulated volume ($V'_m$) with an expected value ($V_0$).

18 Claims, 3 Drawing Sheets

(51) Int. Cl.
    *E21B 47/08* (2012.01)
    *E21B 21/10* (2006.01)
    *G01F 9/00* (2006.01)
    *G01F 23/00* (2006.01)
    *G08B 21/18* (2006.01)

(52) U.S. Cl.
    CPC ............ *G01F 9/00* (2013.01); *G01F 23/0076* (2013.01); *G08B 21/182* (2013.01)

(56) References Cited

U.S. PATENT DOCUMENTS

| | | | |
|---|---|---|---|
| 4,043,193 A | | 8/1977 | Bailey |
| 6,234,250 B1 * | | 5/2001 | Green ................. E21B 47/0003 166/250.03 |
| 2013/0325351 A1 * | | 12/2013 | Haberer ................. E21B 49/08 702/12 |

OTHER PUBLICATIONS

Extended European Search Report issued in the related EP application 15290320.9, dated Jun. 1, 2016 (8 pages).

* cited by examiner

METHOD FOR DETECTING GAIN OR LOSS OF DRILLING FLUID IN A DRILLING INSTALLATION ASSOCIATED CALCULATION SYSTEM AND ASSOCIATED DRILLING INSTALLATION

CROSS-REFERENCE TO RELATED APPLICATIONS

The present invention claims the benefit of European Patent Application No. 15290320.9, filed on Dec. 17, 2015, the entire content of which is hereby re by reference into the current application.

The present disclosure concerns a method for detecting gain or loss of fluid, especially of drilling fluid in a drilling installation.

BACKGROUND

When drilling an oil well or a well for another effluent (in particular gas or water), it is required to accurately monitor the flow of displaced drilling fluids or muds.

The muds circulating in a wellbore during drilling are generally injected from, and returned to, several pits hydraulically connected to each other. The hydraulic connections may be reversible, by operation of valves, in order to control the actual involvement of each pit in the mud supply/recovery in and out of the wellbore.

Fluid gain or loss during drilling may lead to important problems for the further exploitation of the well. However, due to the important volumes of the mud pits, it is difficult to control the volume variations for detecting the gains or losses.

It is known to provide surface sensors to measure the evolution of the mud volume of each of the pits. Due to the fluid transfer between the different pits, it is however not straightforward to derive information about gains and losses from the measurements of the surface sensors.

SUMMARY OF THE DISCLOSURE

An object of the present disclosure is to provide a method for detecting gain or loss of drilling fluid by automatic analysis of the volume variations in the mud pits.

To this end, the present disclosure relates to a method for detecting gain or loss of fluidin the drilling installation comprising a drilling pipe; drilling fluid pits; and a hydraulic connection between the pits and the drilling pipe. The method comprises providing, at a plurality of measuring times of a first period, a set of measurement values representative of a volume of drilling fluid in each of the pits belonging a predetermined group; then, based on volume measurement values, identifying volume variations (associated with respective volume variation periods) occurring during the first period for the pits of the group. The method also includes calculating, for each measuring time, a corrected cumulated volume of drilling fluid for the pits of the predetermined group, based on the identified volume variation occurring in at least a sub-group of the predetermined group, and estimating a first value for a gain or loss of drilling fluid in the wellbore at a measuring time by comparing the corrected cumulated volume with an expected value.

According to advantageous embodiments, the method may comprise one or more of the following features, taken in isolation or in any technically possible combination(s):

- the method comprises raising an alert if the a first value for gain or loss of drilling fluid is superior to a threshold value;
- the method comprises estimating a second value for a gain or loss of drilling fluid at a second measuring time by comparing an amount of drilling fluid exiting the drilling pipe and an amount of drilling fluid entering the drilling pipe at said second measuring time, the first and second measuring times being separated by a predetermined duration, then calculating a corrected gain or loss of drilling fluid in function of the first and second values; then raising an alert if said corrected gain or loss of drilling fluid is superior to a threshold value;
- a variable weighing factor is associated to each of the first and second values of the gain and loss, the weighing factor value being set in function of a parameter of the wellbore;
- the parameter is a flow rate of mud exiting the wellbore;
- identifying volume variation comprises associating the volume variation with a type of volume variation, such as a transfer between at least an emptying pit and at least a filling pit, and/or a single consumption when only a pit is emptying or filling with fluid;
- identifying a transfer between at least two pits during the volume variation period includes comparing a volume variation in each of the at least two pits during said volume variation period;
- identifying a single consumption in a pit includes comparing the slope of the volume variation to a predetermined slope during the volume variation period;
- the method comprises, for each pit, converting the function [measuring time ($t_m$)/measurement value ($va_{i,m}$, $vc_{j,m}$, $vi_{k,m}$)] into segments separated by change-points according to a segmentation model, the volume variation periods for each pit being defined by the change-points;
- the corrected mud volume is calculated based on, for each volume variation involving in at least a pit of the sub-group: a compensation during volume variation, for volume variation having an associated volume variation period includes the measuring time $t_m$, and/or a compensation after volume variation for volume variation having an associated volume variation period that ends before the measuring time $t_m$;
- the compensation during volume variation is expressed as follows:

$$\text{For } t_{0,j} < t_m < t_{f,j} \Delta V_{temp}(t_m, C_j) = \Sigma(V_i(t_m) - V_i(t_{0,j}))$$

$$\text{For } t_m \geq t_{f,j} \text{ and } t_m < t_{0,j}, \Delta V_{temp}(t_m, C_j) = 0$$

Wherein $t_{0,j}$ is the beginning of the volume variation period for the volume variation Cj; $t_{f,j}$ is the end of the volume variation period for the volume variation Cj; and $V_i(t)$ is the volume of a pit i involved in the volume variation Cj at time t;

the compensation after volume variation is expressed as follows:

$$\text{For } t_{0,j} < t_m < t_{f,j} \Delta V_{temp}(t_m, C_j) = \Sigma(V_i(t_m) - V_i(t_{0,j}))$$

$$\text{For } t_m \geq t_{f,j} \text{ and } t_m < t_{0,j}, \Delta V_{temp}(t_m, C_j) = 0$$

Wherein $t_{0,j}$ is the beginning of the volume variation period for the volume variation Cj; $t_{f,j}$ tf,j is the end of the volume variation period for the volume variation Cj; and $V_i(t)$ is the volume of a pit i involved in the volume variation Cj at time t;

the corrected mud volume is calculated according to said formula:

$$V'_m = V_m - \Sigma \Delta V_{final}(t_m, C_j) - \Sigma \Delta V_{temp}(t_m, C_j)$$

Wherein $V_m$ is a cumulated volume of the pits;

the predetermined group includes at least wellbore pits directly involved in the mud supply/recovery in and out of the wellbore and communication pits involved in fluid transfer with the wellbore pits, and the subgroup includes the communication pits;

the predetermined group and/or subgroup may be defined by a user.

The present disclosure also relates to a calculation system comprising a processing unit in interaction with a software application for the implementation of the method described above.

The present disclosure also relates to a drilling installation comprising: a drilling pipe; drilling fluid pits; at least one first hydraulic connection between the pits and the drilling pipe, said at least one second hydraulic connection comprising at least one fluid pump for injecting fluid in the drilling pipe; at least one second hydraulic connection of said pits to each other; a measurement unit comprising sensors able to measure a volume of drilling fluid in each of the pits; and a calculation system such as described above, the sensors being in communication with said calculation system.

According to an advantageous embodiment, the measurement unit also comprise a device able to measure a flowrate of drilling fluid entering the drilling pipe, and a device able to measure a flowrate of drilling fluid exiting the drilling pipe.

The present disclosure will be better understood upon reading the following description, which is given solely by way of example, and which is written with reference to the appended drawings, in which.

DETAILED DESCRIPTION

One or more specific embodiments of the present disclosure will be described below. These described embodiments are examples of the presently disclosed techniques. Additionally, in an effort to provide a concise description of these embodiments, some features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would still be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

In the following description, the term "downstream" is understood with respect to the normal direction of circulation of a fluid in a pipe.

Figure 1:
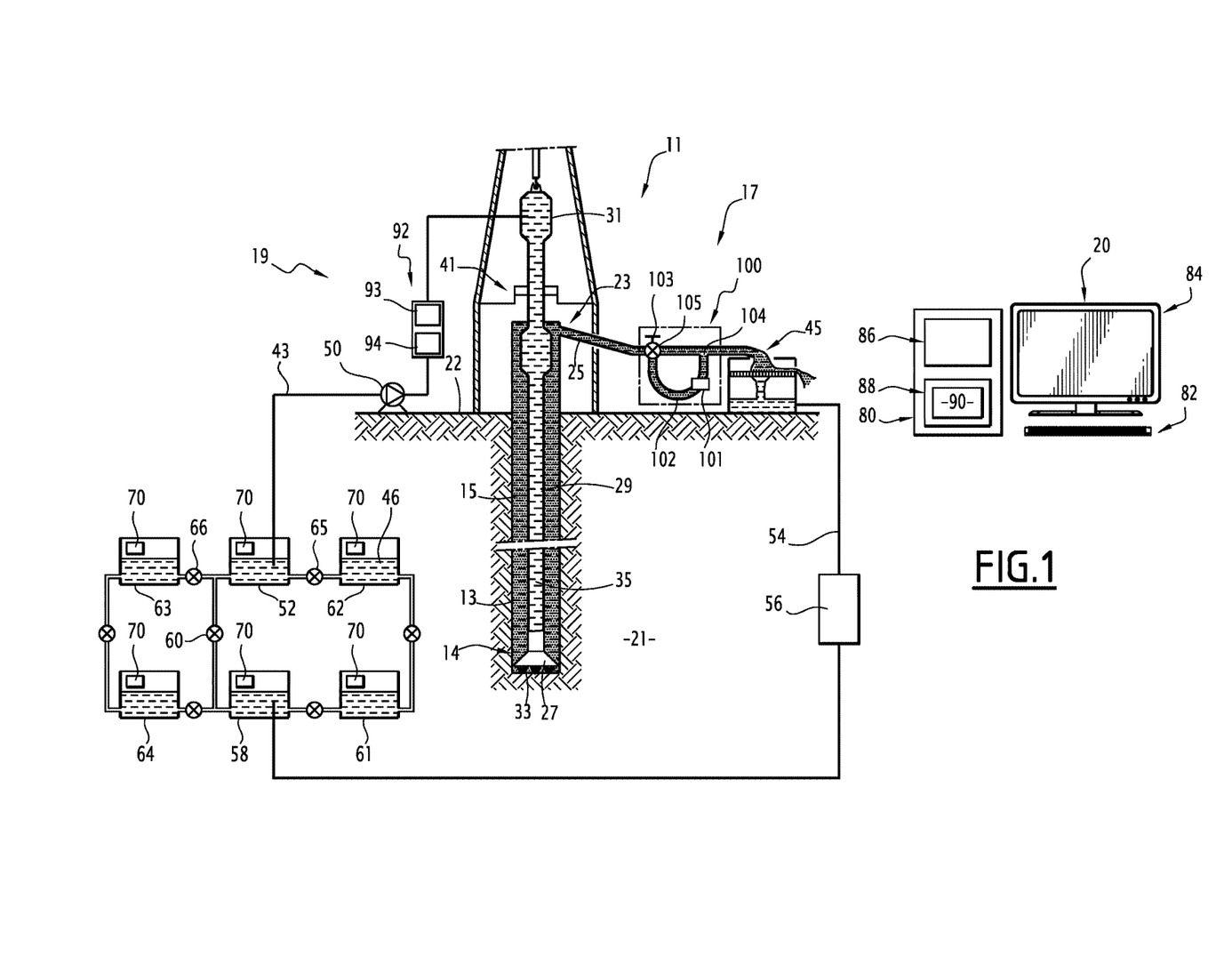
FIG. 1 is a schematic view, in vertical section, of a drilling installation according to an embodiment of the present disclosure.

A drilling installation 11 for a fluid production well, such as a hydrocarbon production well, is illustrated on FIG. 1.

The drilling installation 11 of FIG. 1 comprises a drilling pipe 13 arranged in a cavity 14 bored by a rotary drilling tool 15, and a surface installation 17. The drilling installation 11 also comprises a measurement unit 19 and a calculation system 20.

The drilling pipe 13 is arranged in the cavity 14 formed in the earth formation 21 by the rotary drilling tool 15. This pipe 13 comprises, at the surface 22, a well head 23 provided with a discharge pipe 25.

The drilling tool 15 comprises a drilling head 27, a drill string 29 and a liquid injection head 31.

The drilling head 27 comprises a drill bit 33 for drilling through the rocks of the earth formation 21. It is mounted on the lower portion of the drill string 29 and is positioned in the bottom of the drilling pipe 13.

The string 29 comprises a set of hollow drilling tubes. These tubes delimit an inner space 35 which makes it possible to bring a liquid from the surface 22 to the drilling head 27. To this end, the liquid injection head 31 is screwed onto the upper portion of the string 29.

The surface installation 17 comprises a rotator 41 for supporting the drilling tool 15 and driving it in rotation, a suction line 43 for injecting the drilling liquid, and a shale shaker 45 for collecting the liquid and drilling residues emerging from the discharge pipe 25.

The suction line 43 is hydraulically connected to the injection head 31 in order to introduce and circulate a liquid, especially a drilling mud 46, in the inner space 35 of the drill string 29. In particular, one or more pumps 50 are placed on the suction line 43 to displace the drilling mud 46.

The or each pump 50 is preferably a reciprocating pump, more preferably a piston pump. For example, the pump 50 is a three-piston pump, also known as high pressure triplex pump, or a six-piston pump, also known as hex pump.

The pump 50 illustrated on FIG. 1 is more particularly a "downhole pump" for injecting fluid via the injecting head, in the line called "standpipe". In case of a drilling installation 11 comprising a deepwater hydraulic circuit, the installation 11 may also comprise another line for injecting mud in the wellbore, for instance called "booster line", the fluid being injected in this line thanks to one or several pumps called "booster pumps".

An entry of the suction line 43 is hydraulically connected to at least one suction pit 52 for the supply of drilling mud 46.

The shale shaker 45 is hydraulically connected to a mud duct 54 along which are placed one or several devices 56 such as a de-sander, a mud cleaner and/or a centrifuge. An exit of the mud duct 54 is hydraulically connected to at least one settling pit 58 for the recovery of the drilling mud 46. Preferably, the suction pit 52 and the settling pit 58 belong to the surface installation 17.

The surface installation 17 of FIG. 1 also comprises a hydraulic connection with an operable valve 60 between the suction pit 52 and settling pit 58.

The surface installation 17 of FIG. 1 also comprises one or more reserve pits 61, 62, 63, 64 and hydraulic connections with operable valves 65, 66 between said reserve pits and the suction pit 52 and/or settling pit 58. Each pit 52, 58, 61, 62, 63, 64 may be hydraulically connected to one, several or all of the other pits of the surface installation 17.

The measurement unit 19 comprises at least one measurement device. In particular, the measurement unit 19 of FIG. 1 comprises sensors 70 for measuring the mud level or mud volume in at least some, and preferably each, of the pits 52, 58, 61, 62, 63, 64.

The sensors 70 are connected to the calculation system 20. The calculation system 20 is, for example, a computer.

The calculation system 20 may comprise a processor 80, a man-machine interface 82 and a display unit 84.

The processor 80 comprises a processing unit 86, a memory 88 and a software application 90 stored in the memory 88. The software application 90 is configured to be executed by the processing unit 86.

The man-machine interface 82 is, for example, a touch-screen or a keyboard.

The display unit 84 is, for example, a computer screen. It may be located on the rig or remotely from the rig, in which case it is connected to the measurement unit 19 via a network and potentially an acquisition system. The calculation system may also comprise several processors, situated at different locations and associated or not with a man-machine interface and/or display unit.

In the installation 11 of FIG. 1, the measurement unit 19 comprises a second measurement device 92, situated downstream of the pump or pumps 50, that is to say in the hydraulic connection between the pump or pumps 50 and the injection head 31 in case of the downhole pumps.

The second measurement device 92 comprises sensors 93, 94 able to measure at least one parameter of the pump(s) 50 at the outlet of said pump(s) 50, in order to determine the flowrate of the mud injected in the wellbore. The at least one parameter is for example the number of strokes per minute (SPM), or cycles per minute, of the pump(s).

The sensors 93, 94 are in communication with the calculation system 20. The flowrate may be determined in view of the pump strokes and the geometrical parameters of the pump.

The second measurement device 92 may then comprise a SPM sensor 94 for determining the number of cycles, or strokes, of the pump(s). This sensor may be a proximity sensor, such as a magnetic or optical sensor.

The at least one parameter of the pump 50 may also comprise the mud pressure. It may also comprise a sensor for measuring the temperature and/or the density of the mud exiting the pump. However, it is also possible to choose other parameters. These parameters may also enable to obtain the flowrate of the mud injected in the wellbore taking into account a more complex injection model of the fluid in the wellbore.

The second measurement device 92 illustrated on FIG. 1 may then comprise a pressure sensor 93. The pressure sensor 93 may be a manometer.

In the installation 11 of FIG. 1, the measurement unit 19 comprises a third measurement device in the shape of a mud flow rate sensor installation 100 for measuring the flow rate of the mud exiting the wellbore on the discharge pipe 25 (or flowline) between the exit of the wellbore and the shale shaker 45.

Preferably, as shown on FIG. 1, the mud flow rate installation 100 comprises a flow meter 101 for measuring the flow rate of the fluid exiting the wellbore. It is understood by "flow meter", a device for measuring the flow of a fluid or of a gas. More precisely, the flow meter 101 may be a Coriolis flow meter providing a volume flow rate based on the mass flow rate and the density of the fluid. The Coriolis flow meter is also able to measure the mud density. It may also be any type of flow meter such as ultrasonic, capacitive, electromagnetic, etc.

For instance, the flow meter 101 is installed in a by-pass pipe 102, such as a U-shaped by-pass pipe comprising an inlet 103 opening in the discharge pipe 25 at a first tapping point and an outlet 104 also opening in the discharge point at a second tapping point situated downstream from the first tapping point. The installation 100 also comprises at least a valve 105 at the inlet 103 of the by-pass pipe and used to close the discharge pipe in order that all the fluid exiting the wellbore passes through the by-pass.

The second and third measurement devices are optional, and the installation according to the disclosure may be deprived of a mud flow rate installation at the injection head and exit of the well.

Figure 2:
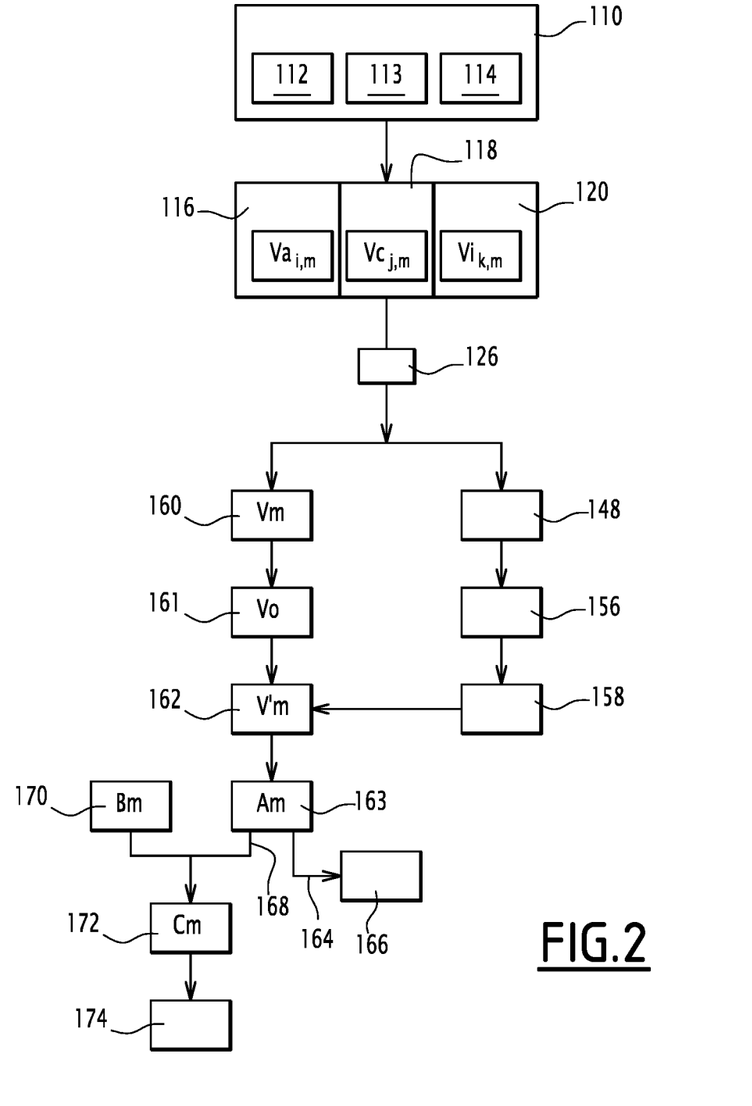
FIG. 2 is an organization chart of a method according to the an embodiment of the present disclosure.

The method for detecting gain or loss of drilling fluid/mud in the drilling installation 11 according to embodiments of the disclosure will now be described, as an example, with reference to FIG. 2. The method is carried out by the software application 90.

The method comprises (box 110) a preliminary classification of the mud pits, into at least two groups. This classification is carried out by an operator, preferably through the man-machine interface 82, in function of the foreseen involvement of each pit in the mud supply/recovery in and out of the wellbore. This operation is however not mandatory as the operations that will be disclosed afterwards may be applied to the whole set of pits.

According to an embodiment, at least the suction pit 52 and the settling pit 58 are classified in a first group 112 of "wellbore pits", considered as directly involved in the mud supply/recovery in and out of the wellbore.

According to an embodiment, some or all of the reserve pits 61, 62 are classified in a second group 113 of "communication pits" if said reserve pits 61, 62 are foreseen to be involved in the mud transfers with the wellbore pits. For example, the reserve pits 61, 62 are classified in the second group if a hydraulic connection between said pits and at least one of the "active pits" is open or susceptible to be opened during the concerned period, by operation of a valve 65.

According to an embodiment, the remaining reserve pits 63, 64, if any, are classified in a third group 114 of "inactive pits", considered as not involved in the mud supply/recovery in and out of the wellbore. For example, the remaining reserve pits 63, 64 are classified in the third group if the hydraulic connection(s) between said pits and the "active pits" and "communication pits" are foreseen to remain closed by means of the valves 66 during the concerned period.

Thereafter, at a plurality of measuring times $t_m$ of a period, the method provides (box 116), a set of measurement values $va_{i,m}$ of a mud volume, at least in each of the "wellbore pits" 52, 58, represented by the indicia i.

According to an embodiment, the method also provides (box 118) a set of measurement values $vc_{j,m}$ of a mud volume in each of the "communication pits" 62, 64, represented by the indicia j. According to an embodiment, the method also provides (box 120) a set of measurement values $vi_{k,m}$ of a mud volume in each of the "inactive pits", represented by the indicia k. Alternatively, the measures may not be taken for the "inactive pits".

The measurement values are provided through the sensor 70 of each mud pit.

Figure 3:
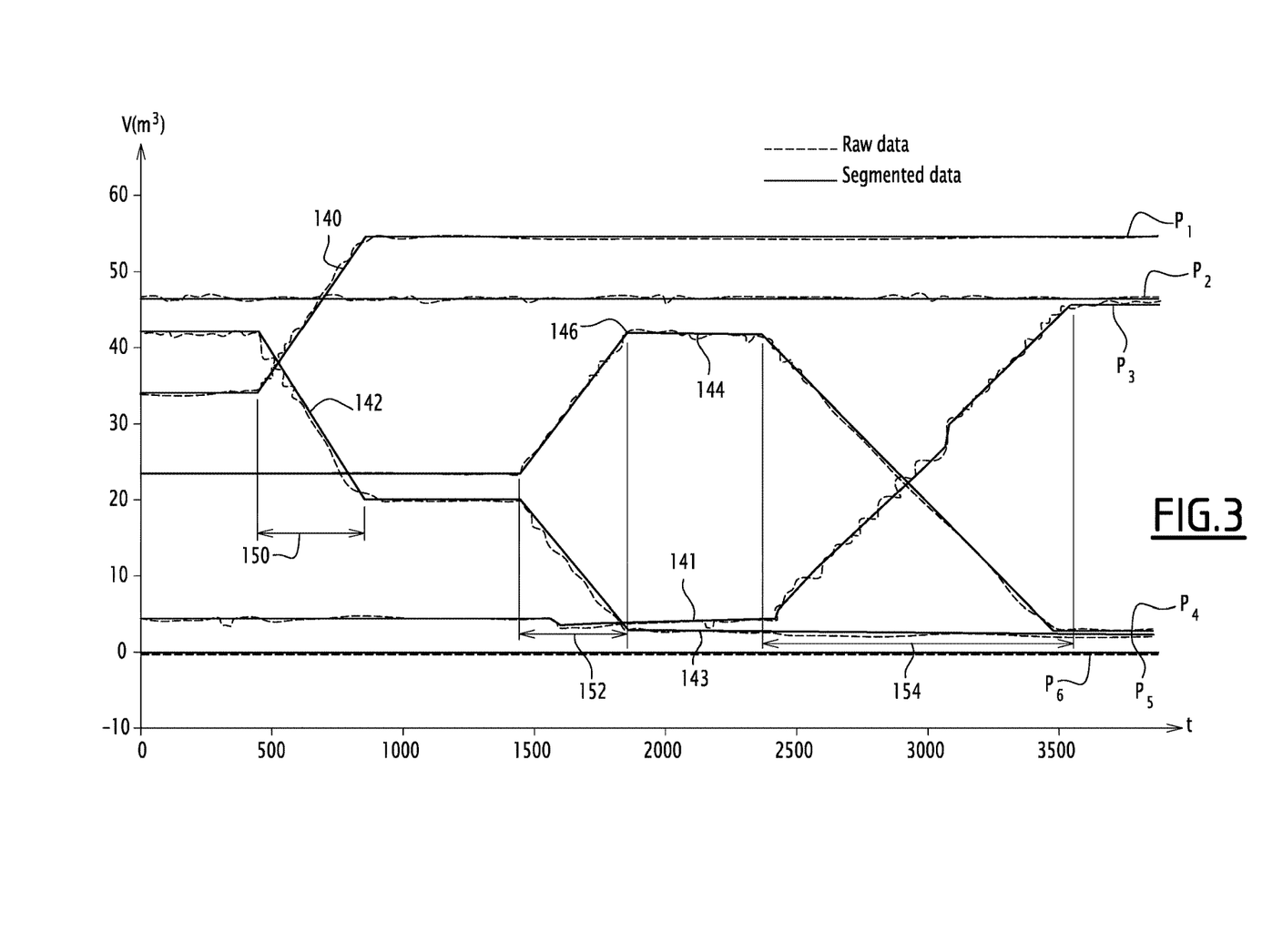
FIG. 3 is a graphical representation of experimental results relating to the method of FIG. 2.

FIG. 3 illustrates the measurement values corresponding to the volume of mud pits $P_1$ to $P_6$ in function of time (raw data). $P_1$ to $P_6$ represent the mud pits of a drilling installation similar to installation 11. For example, $P_1$, $P_3$, $P_4$ and $P_6$ are identified to the "wellbore pits" and "communication pits" 52, 58, 61, 62; and $P_2$ and $P_6$ are identified to the "inactive pits" 63, 64.

Alternatively, even if measures are taken in association with the "inactive" pits, these measures may not be displayed and/or taken into account in the following operations of the method. Alternatively, an operator may choose the pits to take into account to perform the volume variation identification.

In order to suppress the noise and to facilitate the analysis of the data, the method comprises submitting the measurement values $va_{i,m}$, $vc_{j,m}$, and $vi_{k,m}$, (or at least $vc_{j,m}$) to a segmentation (box 126). More specifically, a graphical representation of the function [measuring time $(t_m)$/measurement value $(va_{i,m}, vc_{j,m}, vi_{k,m})$] is converted into segments separated by change-points, according to a segmentation model. In other words, the mud level over time is fitted to a model consisting in a series of segments, wherein the end point of each segment is the starting point of the following segment (also called change-point). A method involving a segmentation is described, for example, in document WO2010/043951.

FIG. 3 also illustrates the segmentation applied to the measurement values corresponding to the volume of mud pits $P_1$ to $P_6$ in function of time.

The segments comprise rising ramps 140, 141, decreasing ramps 142, 143 and flat steps 144. Connected segments, corresponding to a same pit, are delimited by change-points 146.

The method thereafter comprises identifying mud transfers between at least two of the mud pits $P_1$ to $P_6$. First (box 148), the method compares the measurement values of a measurement time $t_m$ with previous values, in order to determine if said measurement time $t_m$ belongs to a volume variation period 150, 152, 154. The volume variation periods are characterized by a volume variation, represented by a rising ramp 140 or decreasing ramp 142, occurring for at least two pits. On the graphical representation of FIG. 3, including segmentation, the completed periods 150, 152, 154 are delimited by change-points 146 corresponding to a same pit or to different pits.

On each volume variation period 150, 152, 154, the method compares (box 156) the volume variations in order to identify a transfer (considered as a first type of volume variation) between one or more emptying pits and one or more filling pits. For example, on period 150, $P_5$ is the emptying pit and $P_1$ is the filling pit. A transfer may be identified even if the volume variation periods of two pits do not fit exactly (for instance, in view of the transfer time of the fluid in the connection pipes between the pits). For instance, a transfer may be identified if the volume variation periods are shifted of less than a predetermined period, such as 1 minute.

The slopes of the concerned ramps 140, 142 are also compared to identify transfers.

The periods 150, 152, 154 and/or ramps 140, 142 associated to an identified transfer are labelled as such and made available on the display unit 84. Thereby, an operator can obtain quantitative information regarding the mud transfers between the pits $P_1$-$P_6$.

Ramps 141, 143 with a slope inferior to a threshold in absolute value may not be taken into account for the transfer identification. Indeed, the range of flowrates used for transfer or injection in the wellbore (corresponding to the slope of the detected volume) are known and if a slope falls under the minimum slope used for such transfer or injection, it is not considered as a normal transfer or injection in the wellbore.

In case there are remaining volume variations for which no correspondence to a transfer was previously found, said remaining volume variations/ramps are then (box 158) labelled as "single consumptions" (considered as a second type of volume variation) and made available on the display unit 84.

Ramps with a slope inferior to a threshold value may also be flagged as "single consumption".

Thereby, an operator can obtain quantitative information regarding the single consumptions of pits $P_1$-$P_6$ and possibly investigate the causes of unexpected consumptions. Said causes may be a leak or an unexpected arrival of mud from the wellbore.

Simultaneously, the method calculates (box 160), for each measuring time $t_m$, a cumulated mud volume $V_m$ for all the pits or at least the groups 112, 113 of "wellbore pits" and "communication" pits, directly or indirectly involved in the mud supply/recovery in and out of the wellbore. The group 114 of "inactive pits" may indeed not be taken into account for the calculation of $V_m$. Alternatively, the calculation of the volume $V_m$ may be performed before or after the operations 148, 156 or 158.

When the wellbore has reached a steady state, i.e. when mud injected in the wellbore has begun coming back in the pits, an expected value $V_0$ of the mud volume in the pits is set (box 161). It may automatically be set by the system when it is detected that the mud volume of the pits does not vary during a predetermined time period or set up by an operator manually.

The method then calculates (box 162) a corrected mud volume $V'_m$ that does not take into account the fluid variations due to transfer and/or single consumption involving at least one pit of the sub-group of pits when the wellbore is in a steady state. Here, only the transfers and single consumptions occurring in the "communication pits" group 113 are considered for computing the corrected mud volume. Alternately, the pits selected by the operator are taken into account for selecting the volume variation to consider in the calculation of the corrected mud volume.

Calculating the corrected mud volume $V'_m$ may comprise calculating a compensation volume during the volume variation and a compensation volume after the volume variation and compensating the cumulated mud volume for these compensation volumes, when the volume variation (transfer or single consumption) involves one of the "communication" (or selected) pits.

This operation may comprise:
Identifying the past volume variations involving at least one of the selected pits, i.e. the transfers or single consumptions associated with a volume variation period that has come to an end,
Determining a compensation volume after the past volume variations, corresponding (in relative value) to the difference of the volume of the pits involved in the volume variation at the end of the volume variation period of the transfer or single consumption and of the volume of said pits at the beginning of said volume variation period. This value may be calculated once at the end of the volume variation.

Mathematically, for a transfer or single consumption Cj involving one or multiple pits i, if $t_{0,j}$ is the beginning of the volume variation period and $t_{f,j}$ is the end of the volume variation period for the transfer Cj, the volume variation after the past transfer is the following:

For $t_m < t_{f,j}, \Delta V_{final}(C_j, t_m) = 0$

For $t_m \geq t_{f,j}, \Delta V_{final}(C_j, t_m) = \Sigma(t_{f,j}) - V_i(t_{0,j}))$ This operation may also comprise:

Identifying at least a volume variation involving at least one of the selected pits, occurring at measuring time $t_m$ (i.e. when the volume variation period includes measuring time $t_m$);

Determining a compensation volume during the volume variation, corresponding (in relative value) to the difference of the volume of the pits involved in the volume variation at measurement time $t_m$ and of the volume of said pits at the beginning of the volume variation period associated with the volume variation. This parameter evolves and may be calculated in real-time during the volume variation.

Mathematically, for a transfer or single consumption Cj involving one or multiple pits i, if $t_{0,j}$ is the beginning of the volume variation period and $t_{f,j}$ is the end of the volume variation period for the transfer Cj, the volume variation during transfer is the following:

For $t_{0,j} < t_m < t_{f,j}, \Delta V_{temp}(t_m, C_j) = \Sigma(V_i(t_m) - V_i(t_{0,j}))$ For $t_m \geq t_{f,j}$ and $t_m < t_{0,j}, \Delta V_{temp}(t_m, C_j) = 0$ This operation may also comprise calculating the corrected mud volume $V'_m$ at measuring time $t_m$ on the basis of the volume variations determined beforehand for all the transfers or singles consumptions $C_j$, with the following formula:

$V'_m = V_m - \Sigma \Delta V_{final}(t_m, C_j) - \Sigma \Delta V_{temp}(t_m, C_j)$ The corrected volume may however be computed in any other appropriate way.

The method preferably comprises a further estimation (box 163) of a first gain or loss of mud $A_m$ at each measuring time $t_m$ by comparing the corrected cumulated volume $V'_m$ with the expected value $V_0$. Comparing the corrected mud volume with the expected value enables not to take into account the fluid transfers in the pits for the determination of a gain or a loss in the wellbore, in order to get a more accurate detection of such gain or loss, even if a lot of different fluid transfers occur simultaneously between the pits. Indeed, the effect of the volume variations not coming from an interaction with the wellbore are cancelled.

According to a first embodiment (arrow 164), the method comprises a further operation (box 166) of raising an alert if the absolute value of the first gain or loss $A_m$ is superior to a threshold value. Afterwards, an operator may investigate the causes of said gain or loss of mud.

According to a second embodiment (arrow 168), the method takes into account a second gain or loss of mud, estimated by another device, before raising an alert.

For example, the method comprises (box 170), for a measuring time $t_m + \Delta t$, an operation including estimating, by the second measurement device 92, an amount of drilling mud 46 entering the drilling pipe 13; estimating, by the mud flow rate installation 100, an amount of drilling mud exiting the drilling pipe 13; then estimating a second gain or loss of mud $B_m$ by comparing the two aforesaid amounts of mud.

This estimations of the two aforesaid amounts of mud may be made through, respectively, an estimation of the flow rate of the at least one pump 50 and an estimation of the flow rate in the discharge pipe 25, in a manner described in the publication "A New Generation of Well Surveillance for Early Detection of Gains and Losses When Drilling Very High Profile Ultradeepwater Wells, Improving Safety, and Optimizing Operating Procedures" (SPE 158374, SPETT 2012 ENERGY CONFERENCE & EXHIBITION).

The method comprises (box 172) a further estimation of a corrected gain or loss $C_m$ at each measuring time $t_m$, in function of the first gain or loss $A_m$ of said measuring time $t_m$, and of the second gain or loss $B_m$ of the measuring time $t_m + \Delta t$.

$\Delta t$ is preferably a constant value, predetermined in the software application 90 and represents a time lapse between the presence of a specific batch of mud in the mud pits 52 and/or 58 and the presence of said specific batch in the drilling pipe 13. $\Delta t$ may be positive, negative or null (in particular if considered as negligible).

According to an embodiment, $C_m$ is a mean value of $A_m$ and $B_m$, with the possible application of constant weighing factors. The weighing factors may be confidence factor depending on the accuracy of the measurements for instance. According to another embodiment, variable weighing factors, such as a value depending on the mud flow rate at the entry and/or exit of the drilling pipe, are applied to $A_m$ and $B_m$ for the calculation of $C_m$. Indeed, the estimation of a gain or loss with a sensor such as a Coriolis sensor situated at the exit of the wellbore is more accurate with higher flow rates. Therefore, the corrected gain or loss $C_m$ may be calculated by applying to the second gain or loss $B_m$ a weighing factor varying according to the mud flow rate at the entry and/or exit of the drilling pipe, the weighing factor associated with the second gain or loss $B_m$ being higher when the flow rate is higher.

The method comprises (box 174) raising an alert if the absolute value of the corrected gain or loss $C_m$ is superior to a threshold value. Afterwards, an operator may investigate the causes of said gain or loss of mud.

In view of the entirety of the present disclosure, including the figures, a person skilled in the art should appreciate that they may readily use the present disclosure as a basis for designing or modifying other processes and structures for carrying out the same uses and/or achieving the same aspects introduced herein. A person skilled in the art should also realize that such equivalent constructions do not depart from the spirit and scope of the present disclosure, and that they may make various changes, substitutions and alterations herein without departing from the spirit and scope of the present disclosure. For example, although the preceding description has been described herein with reference to particular means, materials and embodiments, it is not intended to be limited to the particulars disclosed herein; rather, it extends to functionally equivalent structures, methods, and uses, such as are within the scope of the appended claims.

The invention claimed is:

1. A method for detecting gain or loss of drilling fluid in a drilling installation, said drilling installation comprising a drilling pipe, drilling fluid pits, and a hydraulic connection between the pits and the drilling pipe, said method comprising:

providing at a plurality of measuring times ($t_m$) of a first period, a set of measurement values ($va_{i,m}$; $vc_{j,m}$) representative of a volume of drilling fluid in each of the pits belonging to at least a predetermined group of pits;

then based on volume measurement values, identifying volume variations occurring during the first period for the pits of the predetermined group, each volume variation of a pit being associated with a volume variation period;

calculating, for each measuring time ($t_m$), a corrected cumulated volume of drilling fluid ($V'_m$) for the pits of the predetermined group, wherein the corrected cumulated value is determined based on the identified volume variation occurring in at least a sub-group of the predetermined group, and estimating a first value ($A_m$) for a gain or loss of drilling fluid at a measuring time ($t_m$) by comparing the corrected cumulated volume ($V'_m$) with an expected value ($V_0$), wherein identifying volume variation comprises associating the volume variation with a type of volume variation, where in the type of volume variation includes at least one of the following:

a transfer between at least an emptying pit and at least a filling pit, and/or a single consumption when only a pit is emptying or filling with fluid.

2. The method according to claim 1, wherein identifying a volume variation of the transfer type between at least two pits during the volume variation period includes comparing a volume variation in each of the at least two pits during said volume variation period.

3. The method according to claim 1, wherein identifying a volume variation of the single consumption type in a pit includes comparing the slope of the volume variation to a predetermined slope during the volume variation period.

4. A calculation system comprising a processing unit in interaction with a software application for the implementation of the method according to claim 1.

5. A drilling installation comprising:
a drilling pipe;
drilling fluid pits;
at least one first hydraulic connection between the pits and the drilling pipe, said at least one first hydraulic connection comprising at least one fluid pump for injecting fluid in the drilling pipe;
at least one second hydraulic connection of said pits to each other;
a measurement unit comprising sensors able to measure a volume of drilling fluid in each of the pits; and
a calculation system according to claim 4, the sensors being in communication with said calculation system.

6. A drilling installation according to claim 5, wherein the measurement unit also comprises a device able to measure a flowrate of drilling fluid entering the drilling pipe, and a device able to measure a flowrate of drilling fluid exiting the drilling pipe.

7. The method according to claim 1, further comprising the raising of an alert if the first value for gain or loss of drilling fluid is superior to a threshold value.

8. The method according to claim 1, also comprising:
estimating a second value ($B_m$) for a gain or loss of drilling fluid at a second measuring time ($t_m+\Delta t$) by comparing an amount of drilling fluid exiting the drilling pipe and an amount of drilling fluid entering the drilling pipe at said second measuring time;
the first and second measuring times being separated by a predetermined duration ($\Delta t$), then
calculating a corrected gain or loss ($C_m$) of drilling fluid in function of the first and second values; then
raising an alert if said corrected gain or loss of drilling fluid is superior to a threshold value.

9. The method according to claim 8, wherein a variable weighing factor is associated to each of the first and second values of the gain and loss, the weighing factor value being set in function of a parameter of the wellbore, the parameter being in particular a flow rate of mud exiting the wellbore.

10. A method for detecting gain or loss of drilling fluid in a drilling installation, said drilling installation comprising a drilling pipe, drilling fluid pits, and a hydraulic connection between the pits and the drilling pipe,
said method comprising:
providing at a plurality of measuring times ($t_m$) of a first period, a set of measurement values ($va_{i,m}$; $vc_{j,m}$) representative of a volume of drilling fluid in each of the pits belonging to at least a predetermined group of pits;
then
based on volume measurement values, identifying volume variations occurring during the first period for the pits of the predetermined group, each volume variation of a pit being associated with a volume variation period;
calculating, for each measuring time ($t_m$), a corrected cumulated volume of drilling fluid ($V'_m$) for the pits of the predetermined group, wherein the corrected cumulated value is determined based on the identified volume variation occurring in at least a sub-group of the predetermined group, and
estimating a first value ($A_m$) for a gain or loss of drilling fluid at a measuring time ($t_m$) by comparing the corrected cumulated volume ($V'_m$) with an expected value ($V_0$), comprising, for each pit, converting the function [measuring time ($t_m$)/measurement value ($va_{i,m}$, $vc_{j,m}$, $vi_{k,m}$)] into segments separated by change-points according to a segmentation model, the volume variation periods for each pit being defined by the change-points.

11. The method according to claim 10, further comprising the raising of an alert if the first value for gain or loss of drilling fluid is superior to a threshold value.

12. The method according to claim 10, also comprising:
estimating a second value ($B_m$) for a gain or loss of drilling fluid at a second measuring time ($t_m+\Delta t$) by comparing an amount of drilling fluid exiting the drilling pipe and an amount of drilling fluid entering the drilling pipe at said second measuring time;
the first and second measuring times being separated by a predetermined duration ($\Delta t$), then
calculating a corrected gain or loss ($C_m$) of drilling fluid in function of the first and second values; then
raising an alert if said corrected gain or loss of drilling fluid is superior to a threshold value.

13. A method for detecting gain or loss of drilling fluid in a drilling installation, said drilling installation comprising a drilling pipe, drilling fluid pits, and a hydraulic connection between the pits and the drilling pipe,
said method comprising:
providing at a plurality of measuring times ($t_m$) of a first period, a set of measurement values ($va_{i,m}$; $vc_{j,m}$) representative of a volume of drilling fluid in each of the pits belonging to at least a predetermined group of pits;
then
based on volume measurement values, identifying volume variations occurring during the first period for the pits of the predetermined group, each volume variation of a pit being associated with a volume variation period;

calculating, for each measuring time ($t_m$), a corrected cumulated volume of drilling fluid ($V'_m$) for the pits of the predetermined group, wherein the corrected cumulated value is determined based on the identified volume variation occurring in at least a sub-group of the predetermined group, and estimating a first value ($A_m$) for a gain or loss of drilling fluid at a measuring time ($t_m$) by comparing the corrected cumulated volume ($V'_m$) with an expected value ($V_0$), wherein the corrected mud volume ($V'_m$) is calculated based on, for each volume variation involving in at least a pit of the sub-group:
- a compensation during volume variation, for volume variation having an associated volume variation period including the measuring time $t_m$, and/or
- a compensation after volume variation for volume variation having an associated volume variation period that ends before the measuring time $t_m$.

14. The method according to claim 13, wherein the compensation during volume variation is expressed as follows:

$$\text{For } t_{0,j} < t_m < t_{f,j}, \Delta V_{temp}(t_m, C_j) = \Sigma(V_i(t_m) - V_i(t_{0,j}))$$

$$\text{For } t_m \geq t_{f,j} \text{ and } t_m < t_{0,j}, \Delta V_{temp}(t_m, C_j) = 0$$

wherein $t_{0,j}$ is the beginning of the volume variation period for the volume variation Cj;

$t_{f,j}$ is the end of the volume variation period for the volume variation Cj; and $V_i(t)$ is the volume of a pit i involved in the volume variation Cj at time t.

15. The method according to claim 14, wherein the corrected mud volume is calculated according to the following formula:

$$V'_m = V_m - \Sigma \Delta V_{final}(t_m, C_j) - \Sigma \Delta V_{temp}(t_m, C_j)$$

wherein $V_m$ is a cumulated volume of the pits.

16. The method according to claim 13, wherein the compensation after volume variation is expressed as follows:

$$\text{For } t_m < t_{f,j}, \Delta V_{final}(C_j, t_m) = 0$$

$$\text{For } t_m \geq t_{f,j}, \Delta V_{final}(C_j, t_m) = \Sigma(t_{f,j}) - V_i(t_{0,j}))$$

wherein $t_{0,j}$ is the beginning of the volume variation period for the volume variation Cj;

$t_{f,j}$ is the end of the volume variation period for the volume variation Cj; and $V_i(t)$ is the volume of a pit i involved in the volume variation Cj at time t.

17. The method according to claim 13, further comprising the raising of an alert if the first value for gain or loss of drilling fluid is superior to a threshold value.

18. The method according to claim 13, also comprising:
estimating a second value ($B_m$) for a gain or loss of drilling fluid at a second measuring time ($t_m + \Delta t$) by comparing an amount of drilling fluid exiting the drilling pipe and an amount of drilling fluid entering the drilling pipe at said second measuring time;

the first and second measuring times being separated by a predetermined duration ($\Delta t$), then calculating a corrected gain or loss ($C_m$) of drilling fluid in function of the first and second values; then raising an alert if said corrected gain or loss of drilling fluid is superior to a threshold value.

* * * * *